(12) United States Patent
Lee et al.

(10) Patent No.: US 11,507,509 B2
(45) Date of Patent: Nov. 22, 2022

(54) MEMORY SYSTEM, MEMORY CONTROLLER AND METHOD FOR OPERATING MEMORY SYSTEM FOR DETERMINING WHETHER TO PERFORM DIRECT WRITE BASED ON REFERENCE WRITE SIZE

(71) Applicant: SK hynix Inc., Icheon-si (KR)

(72) Inventors: Do Hyeong Lee, Icheon-si (KR); Yu Jung Lee, Icheon-si (KR); Min Kyu Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/154,980

(22) Filed: Jan. 21, 2021

(65) Prior Publication Data
US 2022/0058125 A1 Feb. 24, 2022

(30) Foreign Application Priority Data
Aug. 18, 2020 (KR) .......................... 10-2020-0102939

(51) Int. Cl.
*G06F 12/0811* (2016.01)
*G06F 13/16* (2006.01)
*G06F 12/02* (2006.01)
*G06F 12/0882* (2016.01)

(52) U.S. Cl.
CPC ...... *G06F 12/0811* (2013.01); *G06F 12/0246* (2013.01); *G06F 12/0882* (2013.01); *G06F 13/1668* (2013.01)

(58) Field of Classification Search
CPC ............ G06F 12/0811; G06F 12/0246; G06F 12/0882; G06F 13/1668
See application file for complete search history.

(56) References Cited

U.S. PATENT DOCUMENTS

| | | | |
|---|---|---|---|
| 2001/0024386 A1* | 9/2001 | Harari ................. | G11C 7/1039 711/E12.04 |
| 2010/0174853 A1* | 7/2010 | Lee ..................... | G06F 12/0804 711/E12.008 |
| 2011/0125955 A1* | 5/2011 | Chen ................... | G06F 12/0246 711/E12.001 |
| 2011/0252187 A1* | 10/2011 | Segal .................. | G06F 12/0246 711/E12.008 |
| 2016/0070336 A1* | 3/2016 | Kojima ............... | G06F 12/0246 711/103 |
| 2016/0203075 A1* | 7/2016 | Shin .................... | G11C 7/1039 711/103 |
| 2017/0003911 A1* | 1/2017 | Uchigaito ............ | G06F 3/0638 |
| 2020/0159419 A1* | 5/2020 | Li ........................ | G06F 3/068 |
| 2021/0334211 A1* | 10/2021 | Duan ................... | G11C 11/5671 |

FOREIGN PATENT DOCUMENTS

KR 10-1569372 B1 11/2015
WO 2012001234 A1 1/2012

* cited by examiner

*Primary Examiner* — Tasnima Matin
(74) *Attorney, Agent, or Firm* — Weaver Austin Villeneuve & Sampson LLP

(57) ABSTRACT

A memory system may transfer a reference write size for a memory device to a host, and, when receiving, from the host, a write request for first data having a size corresponding to a multiple of the reference write size, may directly write the first data to the memory device without caching the first data in a write cache.

20 Claims, 12 Drawing Sheets

MEMORY SYSTEM, MEMORY CONTROLLER AND METHOD FOR OPERATING MEMORY SYSTEM FOR DETERMINING WHETHER TO PERFORM DIRECT WRITE BASED ON REFERENCE WRITE SIZE

CROSS-REFERENCE TO RELATED APPLICATION

The present application claims priority under 35 U.S.C. § 119(a) to Korean Patent Application No. 10-2020-0102939 filed in the Korean Intellectual Property Office on Aug. 18, 2020, which is incorporated herein by reference in its entirety.

BACKGROUND

1. Technical Field

Various embodiments generally relate to a memory system, a memory controller and a method for operating the memory system.

2. Related Art

A memory system, e.g., a storage device, stores data on the basis of a request from a host, such as a computer, a mobile terminal (for example, a smartphone or a tablet), or any of various other electronic devices. The memory system may be a type of device that stores data in a magnetic disk such as a hard disk drive (HDD), or a type of device that stores data in a nonvolatile memory such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute or control operations for reading, writing, or erasing data in a volatile memory or a nonvolatile memory included in the memory system. The memory controller may drive firmware for performing a logical operation for controlling such operations.

When a memory system writes data to a memory device, generally, the memory system caches the data in a write cache and then writes the data, cached in the write cache, to the memory device. At this time, after caching the data in the write cache, the memory system transfers, to a host, a message indicating that data writing is completed. Therefore, the memory system needs to ensure that the data cached in the write cache is written to the memory device even in the case where an SPO (sudden power-off) occurs.

SUMMARY

Various embodiments are directed to a memory system, a memory controller and a method for operating the memory system, capable of improving the performance of an operation of writing data.

Also, various embodiments are directed to a memory system, a memory controller and a method for operating the memory system, capable of minimizing a cost required to cope with an SPO.

In one aspect, embodiments of the present disclosure may provide a memory system including: a memory device including a plurality of memory blocks; and a memory controller configured to communicate with the memory device, and execute a firmware to control the memory device.

The memory controller may transfer a reference write size for the memory device to a host.

When receiving, from the host, a write request for first data having a size corresponding to a multiple of the reference write size, the memory controller may directly write the first data to the memory device without caching the first data in a write cache.

The reference write size may be determined based on a page size corresponding to a first memory block to which user data is written, among the plurality of memory blocks. A memory cell included in the first memory block may be a multi-level cell such as TLC.

When receiving, from the host, a write request for second data having a size not corresponding to a multiple of the reference write size, the memory controller may cache the second data in the write cache.

The memory controller may transfer the reference write size to the host through a response message to a parameter command received from the host. The parameter command may be a command which requests at least one parameter for the memory system. The response message may include a separate field that indicates the reference write size.

After completing an operation of writing the first data to the memory device, the memory controller may transfer a completion message for the write request to the host.

In another aspect, embodiments of the present disclosure may provide a memory controller including: a memory interface configured to communicate with a memory device; and a processor configured to communicate with the memory device through the memory interface, and execute a firmware to control the memory device.

The processor may transfer a reference write size for the memory device to a host.

When receiving, from the host, a write request for first data having a size corresponding to a multiple of the reference write size, the processor may directly write the first data to the memory device without caching the first data in a write cache.

The reference write size may be determined based on a page size corresponding to a first memory block to which user data is written, among a plurality of memory blocks included in the memory device. A memory cell included in the first memory block may be a multi-level cell such as TLC.

When receiving, from the host, a write request for second data having a size not corresponding to a multiple of the reference write size, the processor may cache the second data in the write cache.

The processor may transfer the reference write size to the host through a response message to a parameter command received from the host. The parameter command may be a command which requests at least one parameter for a memory system including the memory controller. The response message may include a separate field that indicates the reference write size.

After completing an operation of writing the first data to the memory device, the processor may transfer a completion message for the write request to the host.

In still another aspect, embodiments of the present disclosure may provide a method for operating a memory system including a memory device.

The method for operating a memory system may include transferring a reference write size for the memory device to a host.

The method for operating a memory system may include receiving a write request for first data having a size corresponding to a multiple of the reference write size, from the host.

The method for operating a memory system may include directly writing the first data to the memory device without caching the first data in a write cache.

The reference write size may be determined based on a page size corresponding to a first memory block to which user data is written, among a plurality of memory blocks included in the memory device.

In the transferring of the reference write size to the host, the memory system may transfer the reference write size to the host through a response message to a parameter command received from the host.

The parameter command may be a command which requests at least one parameter for the memory system.

The response message may include a separate field that indicates the reference write size.

The method for operating a memory system may further include directly writing the first data to the memory device without caching the first data in the write cache, if the first data has a size corresponding to a multiple of the reference write size.

The method may further include caching the first data in the write cache, if the first data has a size not corresponding to a multiple of the reference write size.

The method may further include determining the reference write size based on a page size corresponding to a first memory block to which user data is written, among a plurality of memory blocks included in the memory device.

According to the embodiments of the present disclosure, it is possible to improve the performance of an operation of writing data.

Also, according to the embodiments of the present disclosure, it is possible to minimize a cost required to cope with an SPO.

DETAILED DESCRIPTION

Hereinafter, embodiments of the present disclosure will be described in detail with reference to the accompanying drawings.

Throughout the specification, reference to "an embodiment," "another embodiment" or the like is not necessarily to only one embodiment, and different references to any such phrase are not necessarily to the same embodiment(s). Also, the term "embodiments" when used herein does not necessarily refer to all embodiments.

Figure 1:
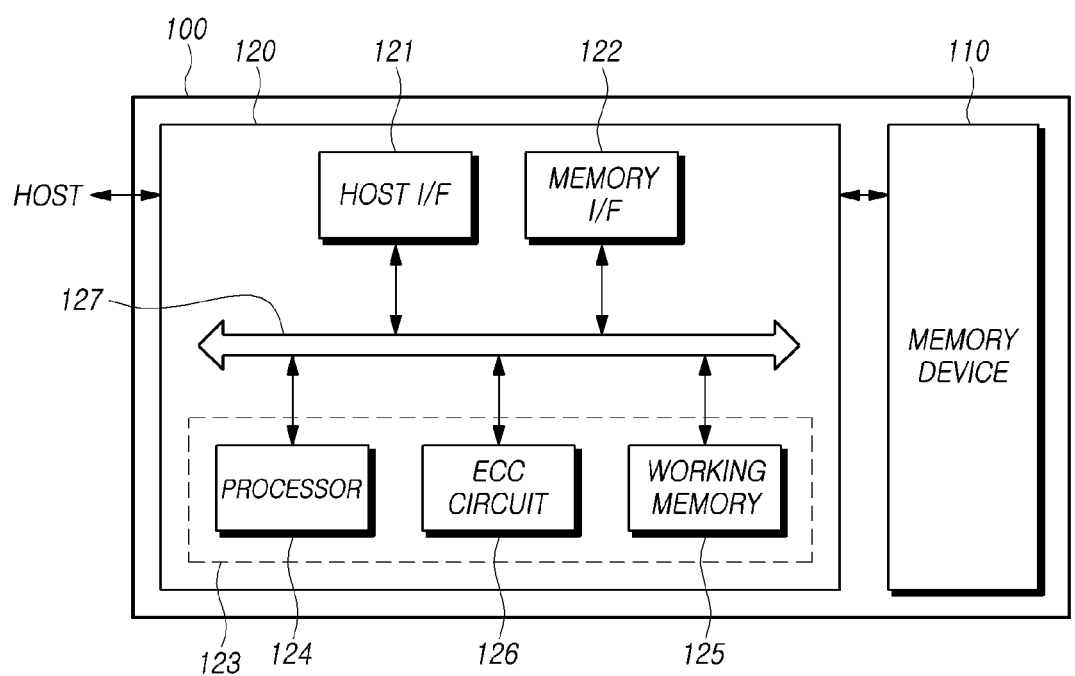
FIG. 1 is a schematic diagram illustrating a configuration of a memory system according to an exemplary embodiment of the present disclosure.

FIG. 1 is a diagram illustrating the schematic configuration of a memory system 100 according to an exemplary embodiment of the present disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation"), an erasure operation, and the like.

The memory device 110 may include a memory cell array including multiple memory cells (also simply referred to as "cells") configured to store data. The memory cell array may exist inside a memory block.

For example, the memory device 110 may be implemented as any of various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array selected using the address. That is, the memory device 110 may perform an operation corresponding to the received command in a memory area of the memory device having a physical address corresponding to the received address from the memory controller 120.

For example, the memory device 110 may perform a program operation, a read operation, an erasure operation, and the like. During the program operation, the memory device 110 may program data in the area selected by the address. During the read operation, the memory device 110 may read data from the area selected by the address. During the erasure operation, the memory device 110 may erase data stored in the area selected by the address.

The memory controller 120 may control write (program), read, erasure, and background operations with regard to the memory device 110. The background operation may include, for example, a garbage collection (GC) operation, a wear leveling (WL) operation, and/or a bad block management (BBM) operation.

The memory controller 120 may control the operation of the memory device 110 at the request of a host. Alternatively, the memory controller 120 may control the operation of the memory device 110 without a corresponding request of the host, such as, for example, when it performs one or more background operations of the memory device.

The memory controller 120 and the host may be separate devices. In another embodiment, the memory controller 120 and the host may be integrated and implemented as a single device. In the following description, the memory controller 120 and the host are separate devices.

Referring to FIG. 1, the memory controller 120 may include a memory interface 122, a control circuit 123, and a host interface 121.

The host interface 121 may be configured to provide an interface for communication with the host (HOST).

When receiving a command from the host, the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control the operation of the memory device 110 by performing operations to exercise overall control of the memory controller 120. For example, the control circuit 123 may include a processor 124 and a working memory 125. The control circuit 123 may further include an error detection/correction circuit (ECC circuit) 126 and the like.

The processor 124 may control overall operation of the memory controller 120. The processor 124 may perform a logical operation. The processor 124 may communicate with the host through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, according to the mapping unit. Typical address mapping methods include a page mapping method, a block mapping method, and a hybrid mapping method.

The processor 124 may be configured to randomize data received from the host. For example, the processor 124 may randomize data received from the host by using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 by using a derandomizing seed. The derandomized data may be output to the host.

The processor 124 may execute firmware (FW) to control the operation of the memory controller 120. In other words, the processor 124 may control overall operation of the memory controller 120 and, in order to perform a logical operation, may execute (drive) firmware loaded into the working memory 125 during booting.

The firmware refers to a program executed inside the memory system 100, and may include various functional layers.

For example, the firmware may include a flash translation layer (FTL) configured to translate between a logical address that the host requests the memory system 100 to provide and a physical address of the memory device 110, a host interface layer (HIL) configured to interpret a command that the host HOST issues to the memory system 100 (storage device) and to deliver the same to the FTL, and/or a flash interface layer (FIL) configured to deliver a command issued by the FTL to the memory device 110.

For example, the firmware may be stored in the memory device 110, then loaded into the working memory 125.

The working memory 125 may store firmware, program codes, commands, or pieces of data to drive the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect an error bit(s) of target data by using an error correction code, and to correct the detected error bit(s). For example, the check target data may be data stored in the working memory 125, data retrieved from the memory device 110, or the like.

The error detection/correction circuit 126 may be implemented to decode data by using the error correction code. The error detection/correction circuit 126 may be implemented by using various code decoders. For example, a decoder that performs nonsystematic code decoding or a decoder that performs systematic code decoding may be used.

For example, the error detection/correction circuit 126 may detect an error bit, sector by sector, with regard to each piece of read data. That is, each piece of read data may include multiple sectors. As used herein, a sector may refer to a data unit smaller than the read unit (page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail". If the BER is lower than or equals to the reference value, the error detection/correction circuit 126 may determine that the corresponding sector is correctable or "a pass".

The error detection/correction circuit 126 may perform error detection and correction operations successively with regard to all pieces of read data. When a sector included in the read data is correctable, the error detection/correction circuit 126 may omit the error detection and correction operations related to the corresponding sector of the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various types of control signals and commands, and a data bus for delivering various types of data.

The above-mentioned constituent elements 121, 122, 124, 125, and 126 of the memory controller 120 are only provided as examples. It is noted that some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. In addition, in some cases, one or more other constituent elements may be added, in addition to the above-mentioned constituent elements of the memory controller 120.

Hereinafter, the memory device 110 is described in more detail with reference to FIG. 2.

Figure 2:
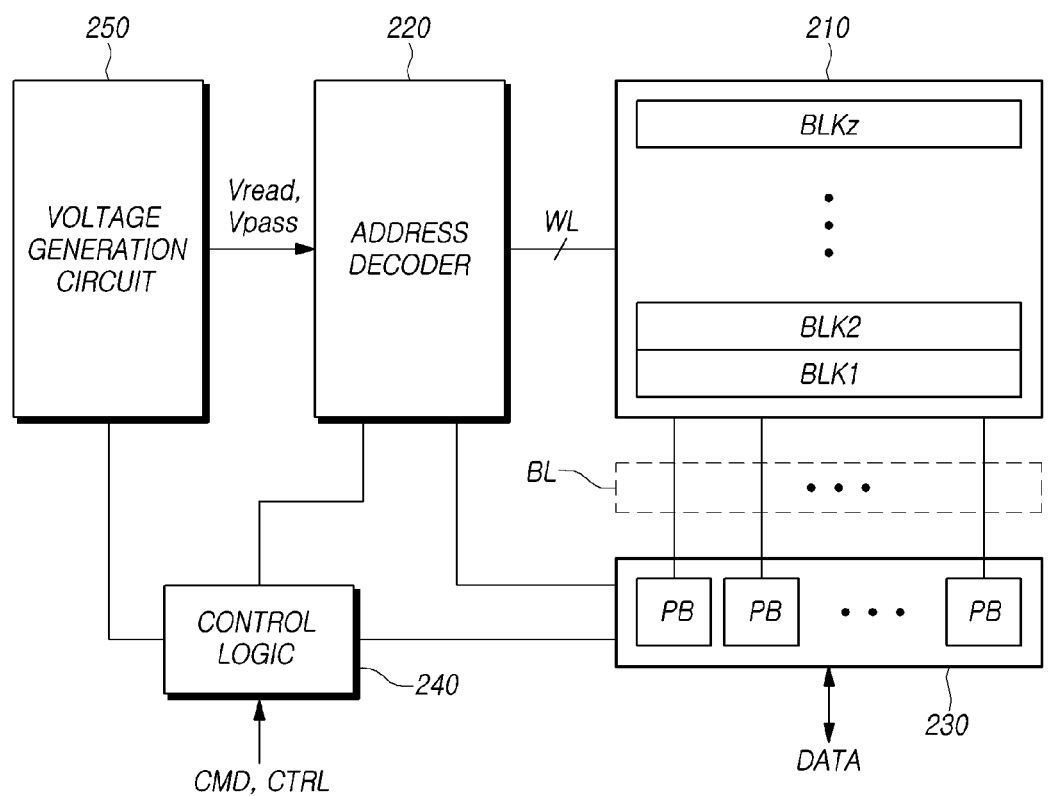
FIG. 2 is a block diagram schematically illustrating a memory device according to an exemplary embodiment of the present disclosure.

FIG. 2 is a block diagram schematically illustrating a memory device 110 according to an exemplary embodiment of the present disclosure.

Referring to FIG. 2, the memory device 110 according to an embodiment of the present disclosure may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, which may have a vertical channel structure.

The memory cell array 210 may be configured as a memory cell array having a two-dimensional structure and, in some cases, may be configured as a memory cell array having a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data. As another example, each of the multiple memory cells included in the memory cell array 210 may be a triple-level cell (TLC) configured to store three bits of data. As another example, each of the multiple memory cells included in the memory cell array 210 may be a quad-level cell (QLC) configured to store four bits of data. As another example, the memory cell array 210 may include multiple memory cells, each of which may be configured to store five or more bits of data.

Referring to FIG. 2, the address decoder 220, the read/write circuit 230, the control logic 240, and the voltage generation circuit 250 may collectively operate as a peripheral circuit configured to drive the memory cell array 210.

The address decoder 220 may be connected to the memory cell array 210 through the multiple word lines WL.

The address decoder 220 may be configured to operate in response to a control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

The address decoder 220 may apply the read voltage Vread to a selected word line WL inside a selected memory block, when applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line according to the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some cases, may further include a cache buffer that operates in a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may consist of multiple pages PG and multiple strings. The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The intersection of the multiple word lines WL and the multiple bit lines BL define multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
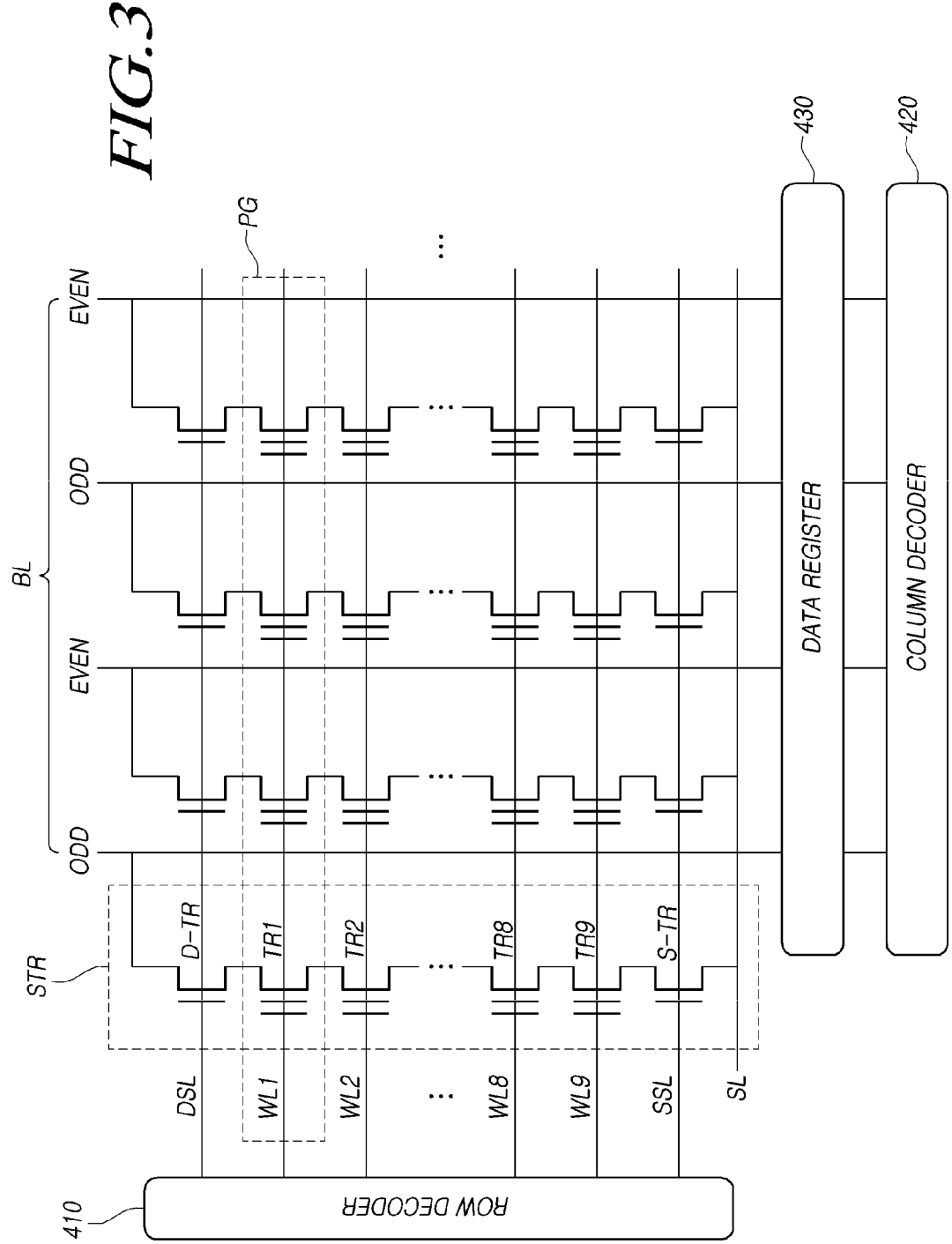
FIG. 3 is a diagram illustrating a structure of word lines and bit lines of a memory device according to an exemplary embodiment of the present disclosure.

FIG. 3 is a diagram illustrating a structure of word lines WL and bit lines BL of a memory device 110 according to an exemplary embodiment of the present disclosure.

Referring to FIG. 3, the memory device 110 has a core area in which memory cells MC are concentrated, and an auxiliary area which corresponds to the remaining non-core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 320, alternating between odd-numbered bit lines BL and even-numbered bit lines BL.

For accessing a memory cell MC, the address may be entered to the core area first through the input/output end and then through the row decoder 310 and the column decoder 320 such that a corresponding target memory cell is designated. As used herein, designating a target memory cell refers to accessing one of the memory cells MC at a site of intersection between one of the word lines WL1-WL9 connected to the row decoder 310 and one of the bit lines BL connected to the column decoder 320, for programming data therein or for reading programmed data therefrom.

The data register 330 plays an important role because all data processing by the memory device 110, including program and read operations, occurs via the data register 330. If data processing by the data register 330 is delayed, all of the other areas need to wait until the data register 330 finishes the data processing. In addition, degradation of performance of the data register 330 may degrade the overall performance of the memory device 110.

Referring to the example illustrated in FIG. 3, in one string STR, multiple transistors TR1-TR9 may be connected to multiple word lines WL1-WL9. The multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 in terms of the signal path among the two outermost word lines WL1 and WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 330. The second selection transistor S-TR plays the role of a switch that turns on or off the connection between the corresponding string STR and the source line SL. That is, the first selection transistor D-TR and the second selection transistor S-TR play the role of gatekeepers which are positioned on opposite ends of the corresponding string STR and deliver/block signals.

During a program operation, the memory system 100 fills the target memory cell MC of the bit line BL which is to be programmed with electrons. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may supply a voltage (for example, +20V) to the substrate through a source line SL during an erasure operation. The memory system 100 floats both the first selection transistor D-TR and the second selection transistor S-TR during an erasure operation, thereby generating an infinite resistance. As a result, the role or effect of the first selection transistor D-TR and that of the second selection transistor S-TR may be removed, and electrons may operate only between the floating gate FG and the substrate due to the potential difference.

Figure 4:
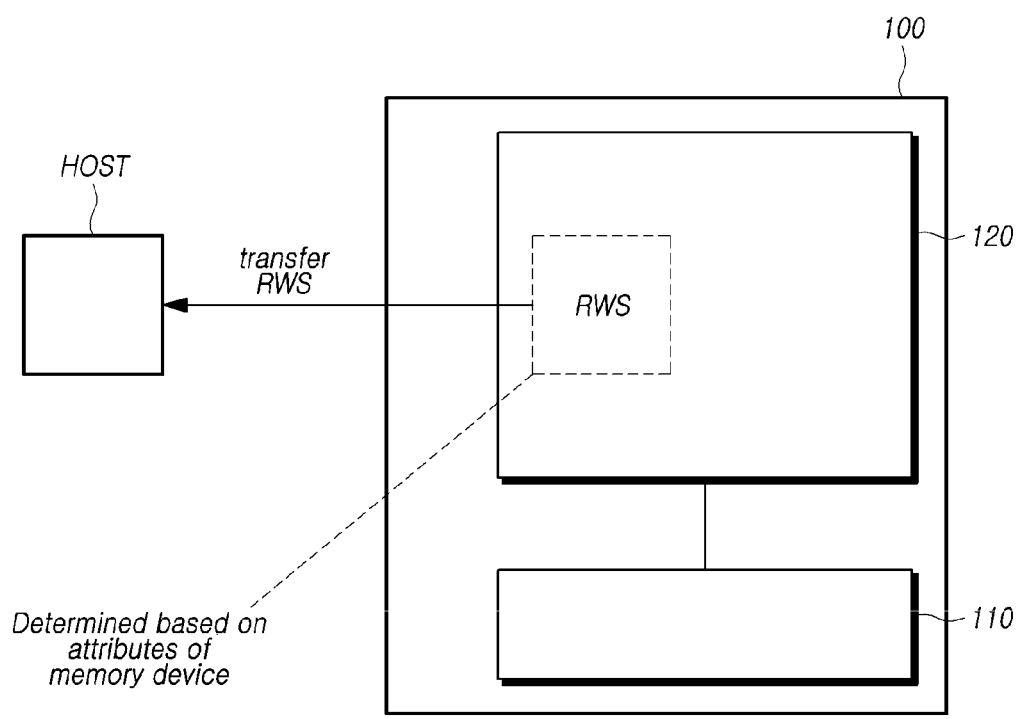
FIG. 4 is a diagram showing an operation in which a memory system according to an exemplary embodiment of the present disclosure transfers a reference data size to a host.

FIG. 4 is a diagram showing an operation in which a memory system 100 according to an exemplary embodiment of the present disclosure transfers a reference data size to a host.

Referring to FIG. 4, a memory controller 120 of the memory system 100 may transfer a reference write size RWS for a memory device 110 to the host.

The reference write size RWS means a unit size that may ensure optimal write performance when the memory system 100 writes data. The reference write size RWS may be determined as a multiple of a minimum unit (e.g. a page size) of data which may be written to the memory device 110.

The reference write size RWS may be referred to as an optimal write size (OWS) or a target write size, and the meaning thereof is not limited by the designation thereof.

The reference write size RWS may be determined based on an attribute of the memory device 110 included in the memory system 100. For example, when the memory device 110 is a 3D NAND flash memory, the reference write size RWS may be determined based on the number of stacks (e.g., 72 stacks or 96 stacks). For another example, the reference write size RWS may be determined based on an attribute (e.g., an SLC, an MLC or a TLC) of a memory cell included in the memory device 110.

The memory controller 120 may transfer the reference write size RWS to the host. When the host transfers a write request to the memory system 100, in order to ensure optimal write performance, the host may determine a size of data to be written to the memory system 100, based on the reference write size RWS.

Figure 5:
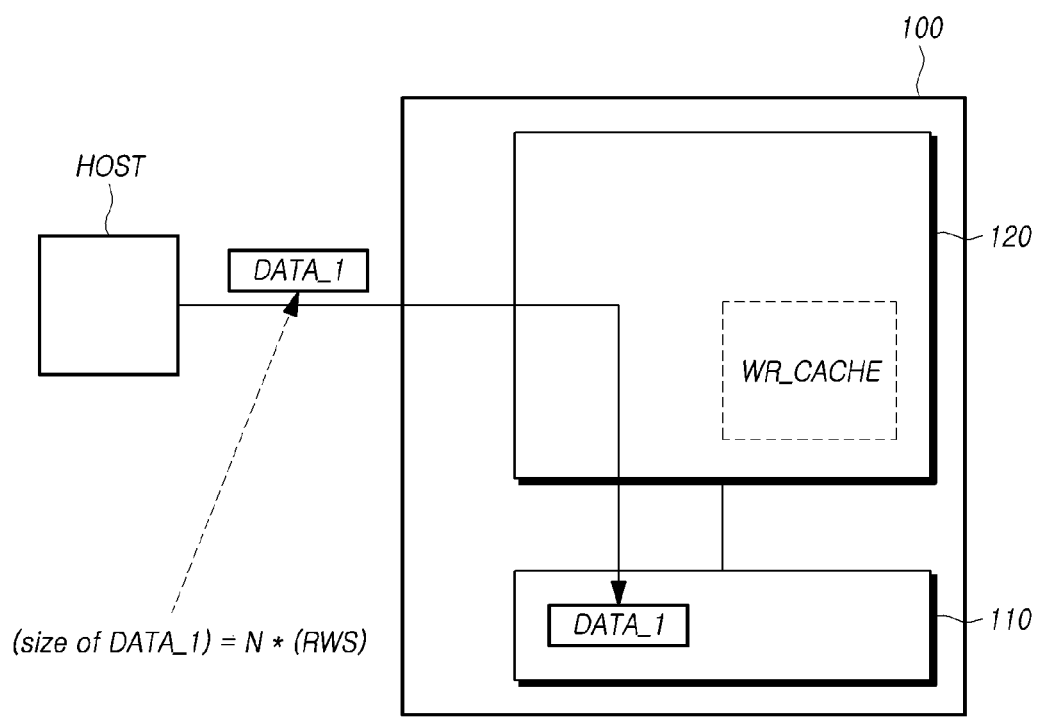
FIG. 5 is a diagram showing an operation in which a memory system according to an exemplary embodiment of the present disclosure directly writes first data, received from a host, to a memory device.

FIG. 5 is a diagram showing an operation in which a memory system 100 according to an exemplary embodiment of the present disclosure directly writes first data, received from a host, to a memory device 110.

Referring to FIG. 5, when a memory controller 120 of the memory system 100 receives, from the host, a write request for first data DATA_1 which has a size corresponding to a multiple of a reference write size RWS, the memory controller 120 may directly write the first data DATA_1 to the memory device 110 without caching the first data DATA_1 in a write cache WR_CACHE.

That is to say, instead of caching the first data DATA_1 in the write cache WR_CACHE and thereafter writing the cached first data DATA_1 to the memory device 110 together with other data cached in the write cache WR_CACHE, the memory controller 120 may immediately write the first data DATA_1 to the memory device 110.

The fact that the first data DATA_1 has a size corresponding to a multiple of the reference write size RWS means that the size of the first data DATA_1 is N times (N is a natural number) the reference write size RWS. For example, in the case where the reference write size RWS is 4 KB, the size of the first data DATA_1 may be 4 KB, 8 KB, 12 KB, 16 KB, . . . . . In this example, N is a positive integer, such as 1, 2, 3, 4, . . . , etc.

The write cache WR_CACHE as a cache region positioned in the memory controller 120 is used to collect and process, all at once, write requests received at different times from the host. The write cache WR_CACHE may be positioned in the working memory 125 in the memory controller 120 or in a separate volatile memory (e.g., a TCM or an SRAM) in the memory controller 120.

The reason why, as described above, when writing the first data DATA_1 which has a size corresponding to a multiple of the reference write size RWS, the memory controller 120 directly writes the first data DATA_1 to the memory device 110 is as follows.

Since, as described above, the reference write size RWS is a unit size capable of ensuring § rite performance when the memory system 100 writes data, even when the memory controller 120 writes, in order to secure optimal write performance, only the first data DATA_1 to the memory device 110 without the necessity of merging the first data DATA_1 with other data, a degradation in write performance does not occur.

Further, when, in this way, the memory controller 120 directly writes the first data DATA_1 to the memory device 110, an amount of data to be cached in the write cache WR_CACHE decreases. Therefore, a cost required to write data, cached in the write cache WR_CACHE, to the memory device 110 when an SPO occurs (for example, a cost required to add a capacitor for supplying power when an SPO occurs) may be reduced. Since such a cost increases in proportion to a size of data cached in the write cache WR_CACHE, the cost is reduced when the size of the data cached in the write cache WR_CACHE decreases.

On the other hand, if the first data DATA_1 is written to the memory device 110 after being cached in the write cache WR_CACHE, the memory controller 120 needs to convert the first data DATA_1 into a type capable of being cached in the write cache WR_CACHE. Also, the memory controller 120 should periodically check whether data cached in the write cache WR_CACHE may be written to the memory device 110. In addition, in the case where a size of a free space of the write cache WR_CACHE is smaller than a size of the first data DATA_1, a problem may be caused in that the write request for the first data DATA_1 is not completed but in a standby state.

If such a case occurs, since a time at which data write-requested by the host is actually written to the memory device 110 is delayed, the performance of an operation of writing the data may degrade. Consequently, the memory controller 120 of the memory system 100 may increase the performance of an operation of writing data, by directly writing the first data DATA_1, which has a size corresponding to a multiple of the reference write size RWS, to the memory device 110.

Figure 6:
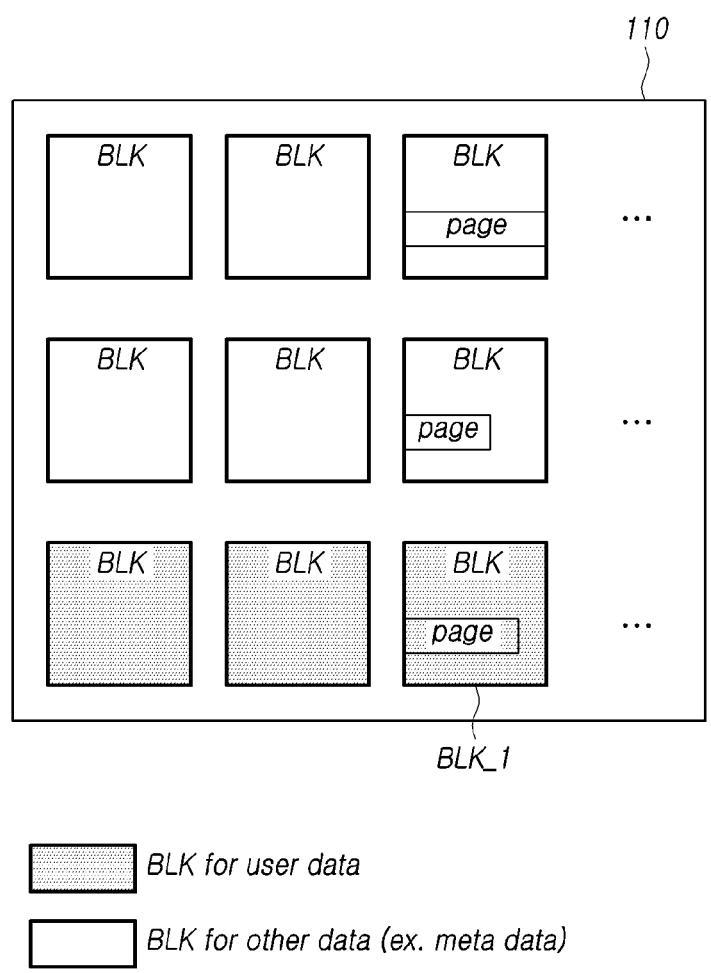
FIG. 6 is a diagram illustrating an example of a memory device according to exemplary an embodiment of the present disclosure.

FIG. 6 is a diagram illustrating an example of a memory device 110 according to an exemplary embodiment of the present disclosure.

Referring to FIG. 6, the memory device 110 may include a plurality of memory blocks BLK, and page sizes corresponding to the respective memory blocks BLK may be different from one another. For example, if a page size corresponding to any one memory block BLK among the plurality of memory blocks BLK is 4 KB, a page size corresponding to another memory block BLK may be 8 KB. Even in the case where, in this way, the page sizes of the respective memory blocks BLK are different from one another, a reference write size RWS determined as one value.

In FIG. 6, the plurality of memory blocks BLK included in the memory device 110 may be divided into memory blocks BLK to which user data is written and memory blocks BLK to which other data (e.g., metadata for the user data) is written. A page size corresponding to a memory block BLK to which user data is written and a page size corresponding to a memory block BLK to which other data is written may be different from each other.

The reference write size RWS may be determined based on a page size corresponding to a first memory block BLK_1 to which user data is written, among the plurality of memory blocks BLK. The reason to this resides in that, since most of data which is write-requested by the host is user data, the percentage of data which is directly written to the memory device 110 increases only when the reference write size RWS is determined based on the first memory block BLK_1 to which the user data is written.

A memory cell which is included in the first memory block BLK_1 may be, for example, a TLC. The reason to this resides in that, unlike data, such as metadata, whose size is small but whose stability and fast read/write speed are more important, a size is regarded as an important factor in terms of user data and thus an amount of data stored in one memory cell needs to be large. Therefore, unlike an SLC included in a memory block BLK to which metadata is written, a memory cell included in the first memory block BLK_1 may be a TLC capable of storing more data than the SLC.

Heretofore, description was made for a case where the host transfers, to the memory system 100, a request to write data having a size corresponding to a multiple of the reference write size RWS. However, the host does not always transfer, to the memory system 100, a request to write data having a size corresponding to a multiple of the reference write size RWS. Here in below, description will be made for a case where the host transfers, to the memory system 100, a request to write data having a size not corresponding to a multiple of the reference write size RWS.

Figure 7:
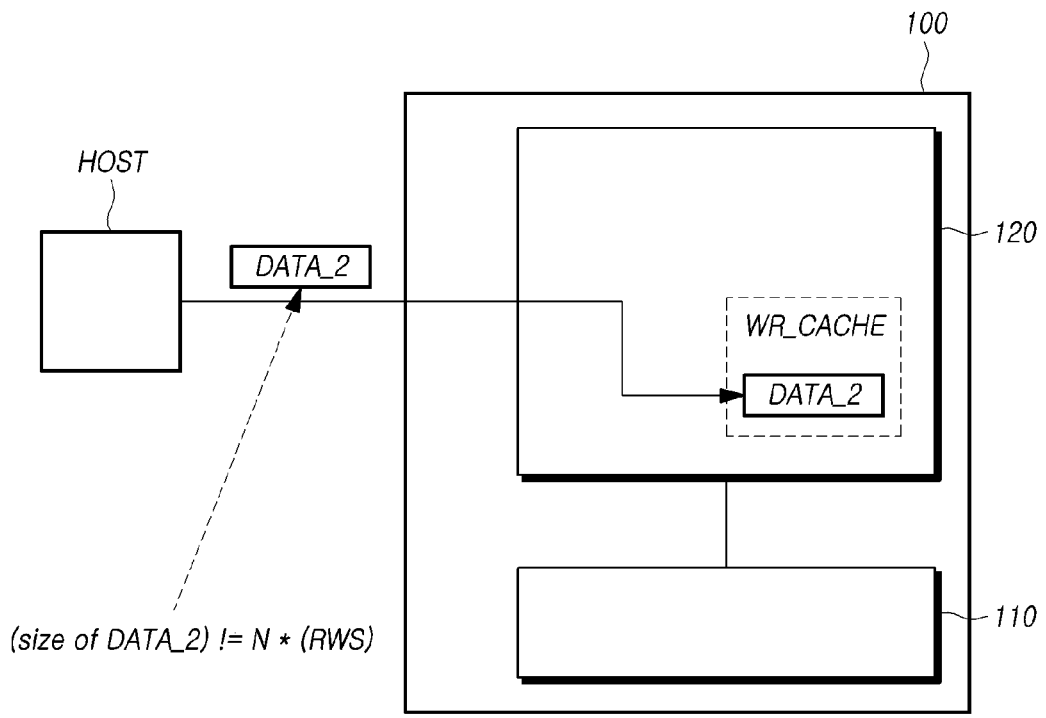
FIG. 7 is a diagram showing an operation in which a memory system according to an exemplary embodiment of the present disclosure writes second data, received from a host, to a write cache.

FIG. 7 is a diagram showing an operation in which a memory system 100 according to an exemplary embodiment of the present disclosure writes second data, received from a host, to a write cache.

Referring to FIG. 7, when a memory controller 120 of the memory system 100 receives, from the host, a write request for second data DATA_2 which has a size not corresponding to a multiple of a reference write size RWS, the memory controller 120 may cache the second data DATA_2 in a write cache WR_CACHE.

The fact that the second data DATA_2 has a size not corresponding to a multiple of the reference write size RWS means that the size of the second data DATA_2 is not N times (N is a natural number) the reference write size RWS. For example, in the case where the reference write size RWS is 4 KB, the size of the second data DATA_2 may be 5 KB, 9 KB, 11 KB, 17 KB, . . . .

When, in this way, the memory controller 120 writes the second data DATA_2 which has a size not corresponding to a multiple of the reference write size RWS, optimal write performance cannot be ensured only with the second data DATA_2.

Therefore, the memory controller 120 may cache the second data DATA_2 in the write cache WR_CACHE in order to ensure optimal write performance by writing the second data DATA_2 together with other data to the memory device 110.

Hereinafter, the embodiments described above with reference to FIGS. 4 to 7 will be described through a flow chart.

Figure 8:
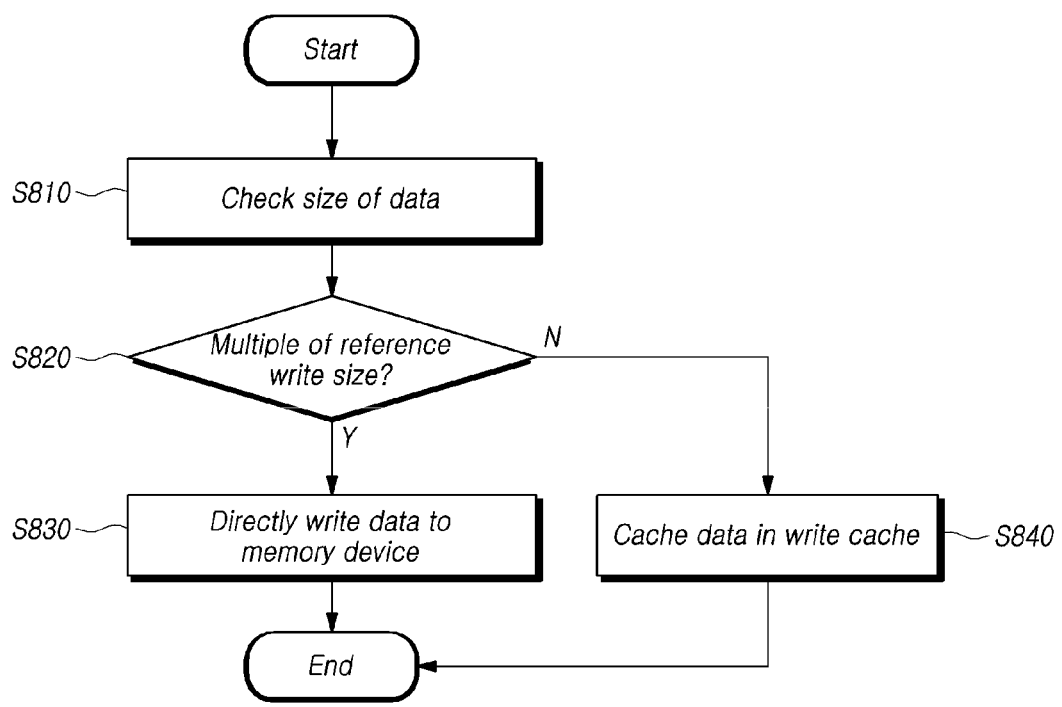
FIG. 8 is a flow chart showing an operation in which a memory system according to an exemplary embodiment of the present disclosure writes data to a memory device or a write cache.

FIG. 8 is a flow chart showing an operation in which a memory system 100 according to an exemplary embodiment of the present disclosure writes data to a memory device or a write cache.

Referring to FIG. 8, when a memory controller 120 of the memory system 100 receives a write request for data from a host, the memory controller 120 may first check a size of the corresponding data (S810).

The memory controller 120 determines whether the size of the corresponding data is a multiple of the above-described reference write size RWS (S820).

When the size of the corresponding data is a multiple of the reference write size RWS (S820-Y), the memory controller 120 may directly write the corresponding data to the memory device 110 without caching the corresponding data in the write cache WR_CACHE (S830).

On the other hand, when the size of the corresponding data is not a multiple of the reference write size RWS (S820-N), the memory controller 120 may cache the corresponding data in the write cache WR_CACHE (S840).

Figure 9:
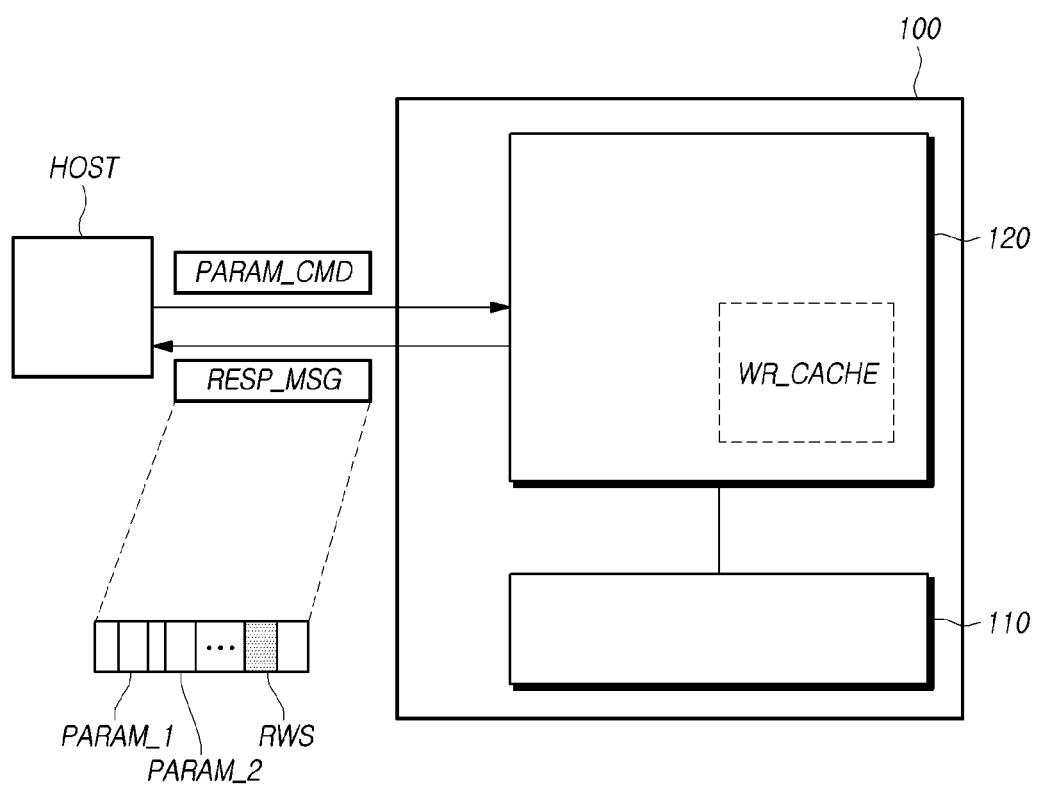
FIG. 9 is a diagram showing an operation in which a memory system according to an exemplary embodiment of the present disclosure transfers a reference data size to a host through a response message to a parameter command.

FIG. 9 is a diagram showing an operation in which a memory system 100 according to an exemplary embodiment of the present disclosure transfers a reference data size to a host through a response message to a parameter command.

Referring to FIG. 9, a memory controller 120 of the memory system 100 may transfer the reference write size RWS to the host through a response message RESP_MSG to a parameter command PARAM_CMD received from the host.

The parameter command PARAM_CMD is a command which is transferred by the host to request at least one parameter for the memory system 100. The parameter for the memory system 100 may be information (e.g., a storage capacity, a format or a capability) related with the operation of the memory system 100.

The parameter command PARAM_CMD may be changed in its format depending on a communication standard between the host and the memory system 100.

For example, in the case where the host and the memory system 100 communicate with each other through the NVMe standard, the parameter command PARAM_CMD may be an identify command defined in the NVMe standard.

The response message RESP_MSG may include a separate field that indicates the reference write size RWS. In other words, the response message RESP_MSG may include a field that indicates the reference write size RWS, in addition to fields that indicate other parameters PARAM_1, PARAM_2, . . . . The memory controller 120 may transfer a value of the reference write size RWS to the host through the field.

Figure 10:
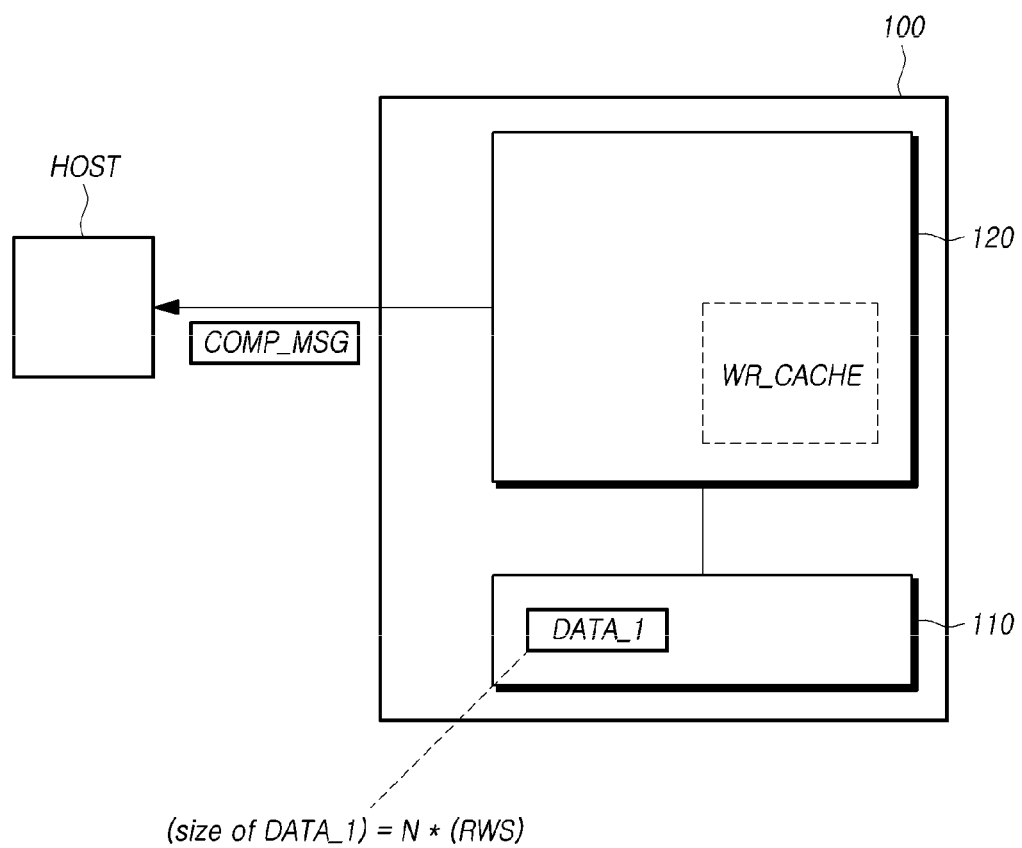
FIG. 10 is a diagram showing an operation in which a memory system according to an exemplary embodiment of the present disclosure transfers a completion message for a write request to a host.

FIG. 10 is a diagram showing an operation in which a memory system 100 according to an exemplary embodiment of the present disclosure transfers a completion message for a write request to a host.

Referring to FIG. 10, after completing an operation of writing first data DATA_1 to a memory device 110, a memory controller 120 of the memory system 100 may transfer, to the host, a completion message COMP_MSG for a write request from the host.

The first data DATA_1 is directly written to the memory device 110 without being cached in a write cache WR_CACHE. Therefore, the memory controller 120 may transfer the completion message COMP_MSG to the host immediately when the operation of writing the first data DATA_1 to the memory device 110 is completed.

Figure 11:
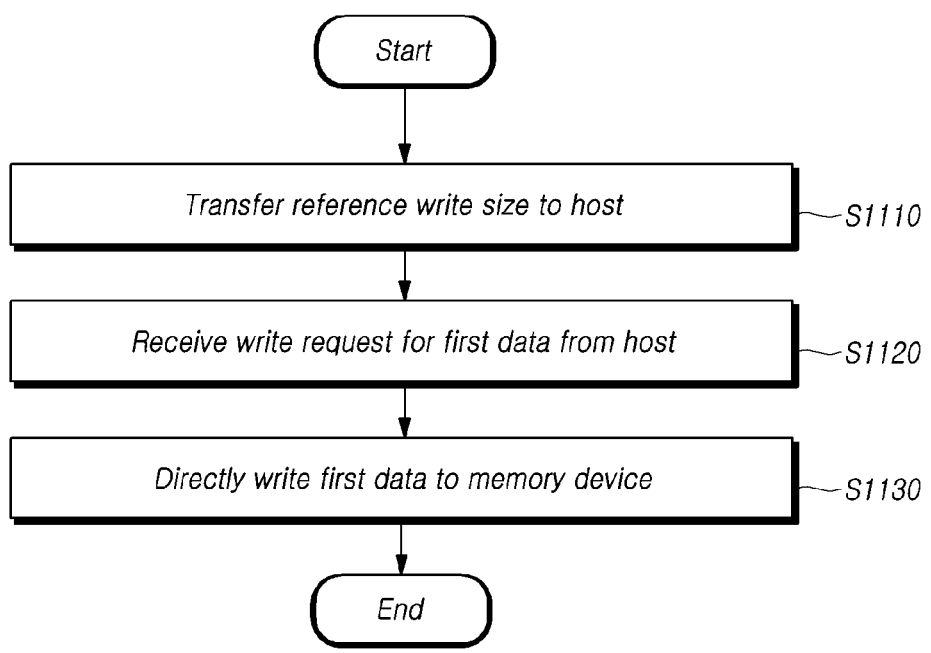
FIG. 11 is a flow chart showing a method for operating a memory system according to an exemplary embodiment of the disclosure.

FIG. 11 is a flow chart showing a method for operating a memory system 100 according to an embodiment of the disclosure.

Referring to FIG. 11, the method for operating the memory system 100 may include step S1110 of transferring a reference write size RWS for a memory device 110 to a host.

The reference write size RWS may be determined based on a page size corresponding to a first memory block to which user data is written, among a plurality of memory blocks included in the memory device 110.

At the step S1110, the reference write size RWS may be transferred to the host through a response message to a parameter command received from the host. The parameter command may be a command which requests at least one parameter for the memory system 100. The response message may include a separate field that indicates the reference write size RWS.

The method for operating the memory system 100 may include step S1120 of receiving a write request for first data from the host.

The method for operating the memory system 100 may include step S1130 of directly writing the first data to the memory device 110 without caching the first data in a write cache, depending on whether the first data has a size corresponding to a multiple of the reference write size RWS.

Meanwhile, the above-described operation of the memory controller 120 may be controlled by the control circuit 123, and may be performed in such a manner that the processor 124 executes (drives) firmware to which general operations of the memory controller 120 are programmed.

Figure 12:
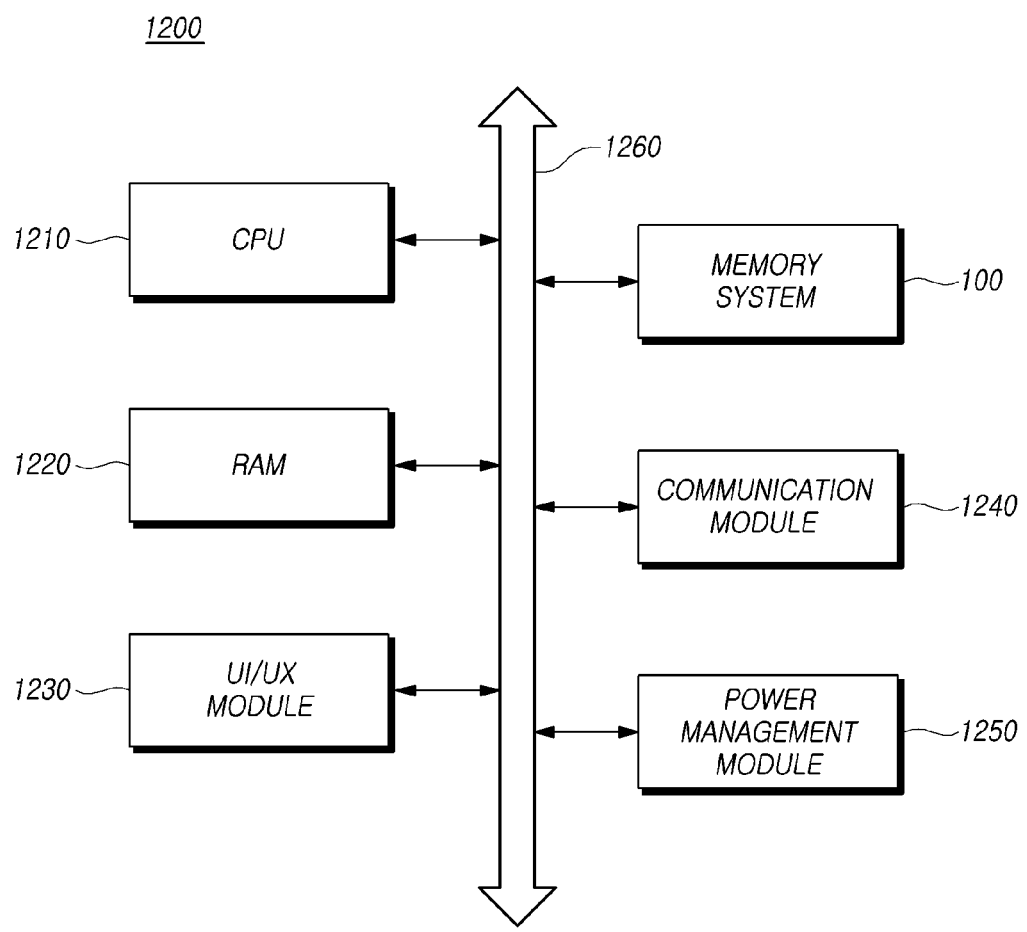
FIG. 12 is a diagram illustrating the configuration of a computing system according to exemplary embodiments of the present disclosure.

FIG. 12 is a diagram illustrating the configuration of a computing system 1200 according to an exemplary embodiment of the present disclosure.

Referring to FIG. 12, the computing system 1200 according to an embodiment of the present disclosure may include: a memory system 100 electrically connected to a system bus 1260; a CPU 1210 configured to control the overall operation of the computing system 1200; a RAM 1220 configured to store data and information related to operations of the computing system 1200; a user interface/user experience (UI/UX) module 1230 configured to provide the user with a user environment; a communication module 1240 configured to communicate with an external device as a wired and/or wireless type; and a power management module 1250 configured to manage power used by the computing system 1200.

The computing system 1200 may be a personal computer (PC) or may include a mobile terminal such as a smartphone, a tablet or various electronic devices.

The computing system 1200 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

According to embodiments of the present disclosure described above, the operation delay time of the memory system may be minimized. In addition, according to an embodiment of the present disclosure, an overhead occurring in the process of calling a specific function may be minimized. Although various embodiments of the present disclosure have been described for illustrative purposes, those skilled in the art will appreciate that various modifications, additions and substitutions are possible, without departing from the scope and spirit of the disclosure as disclosed in the accompanying claims. Therefore, embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A memory system comprising:
a memory device including a plurality of memory blocks; and
a memory controller configured to communicate with the memory device, and execute a firmware to control the memory device,
wherein the memory controller transfers a reference write size for the memory device to a host,
wherein, when receiving, from the host, a write request for first data having a size corresponding to a multiple of the reference write size, the memory controller directly writes the first data to the memory device without caching the first data in a write cache, and
wherein the reference write size is determined based on the number of vertical stacks of the memory device and the number of storage bits level of a memory cell of the memory device.

2. The memory system of claim 1, wherein the reference write size is determined based on a page size corresponding to a first memory block to which user data is written, among the plurality of memory blocks.

3. The memory system of claim 2, wherein a memory cell included in the first memory block is a TLC.

4. The memory system of claim 1, wherein, when receiving, from the host, a write request for second data having a size not corresponding to a multiple of the reference write size, the memory controller caches the second data in the write cache.

5. The memory system of claim 1,
wherein the memory controller transfers the reference write size to the host through a response message to a parameter command received from the host, and
wherein the parameter command is a command which requests at least one parameter for the memory system.

6. The memory system of claim 5, wherein the response message includes a separate field that indicates the reference write size.

7. The memory system of claim 1, wherein, after completing an operation of writing the first data to the memory device, the memory controller transfers a completion message for the write request to the host.

8. A memory controller comprising:
a memory interface configured to communicate with a memory device; and
a processor configured to communicate with the memory device through the memory interface, and execute a firmware to control the memory device,
wherein the processor transfers a reference write size for the memory device to a host,
wherein, when receiving, from the host, a write request for first data having a size corresponding to a multiple of the reference write size, the processor directly writes the first data to the memory device without caching the first data in a write cache, and
wherein the reference write size is determined based on the number of vertical stacks of the memory device and the number of storage bits level of a memory cell of the memory device.

9. The memory controller of claim 8, wherein the reference write size is determined based on a page size corresponding to a first memory block to which user data is written, among a plurality of memory blocks included in the memory device.

10. The memory controller of claim 9, wherein a memory cell included in the first memory block is a TLC.

11. The memory controller of claim 8, wherein, when receiving, from the host, a write request for second data having a size not corresponding to a multiple of the reference write size, the processor caches the second data in the write cache.

12. The memory controller of claim 8,
wherein the processor transfers the reference write size to the host through a response message to a parameter command received from the host, and
wherein the parameter command is a command which requests at least one parameter for a memory system including the memory controller.

13. The memory controller of claim 12, wherein the response message includes a separate field that indicates the reference write size.

14. The memory controller of claim 8, wherein, after completing an operation of writing the first data to the memory device, the processor transfers a completion message for the write request to the host.

15. A method for operating a memory system, comprising:
transferring a reference write size for a memory device to a host;
receiving a write request for first data from the host; and
directly writing the first data to the memory device without caching the first data in a write cache, depending on whether the first data has a size corresponding to a multiple of the reference write size,
wherein the reference write size is determined based on the number of vertical stacks of the memory device and the number of storage bits level of a memory cell of the memory device.

16. The method of claim 15, wherein the reference write size is determined based on a page size corresponding to a first memory block to which user data is written, among a plurality of memory blocks included in the memory device.

17. The method of claim 15,
wherein the transferring of the reference write size to the host transfers the reference write size to the host through a response message to a parameter command received from the host, and
wherein the parameter command is a command which requests at least one parameter for the memory system.

18. The method of claim 15, further comprising directly writing the first data to the memory device without caching the first data in the write cache, if the first data has a size corresponding to a multiple of the reference write size.

19. The method of claim 18, further comprising caching the first data in the write cache, if the first data has a size not corresponding to a multiple of the reference write size.

20. The method of claim 19, further comprising determining the reference write size based on a page size corresponding to a first memory block to which user data is written, among a plurality of memory blocks included in the memory device.

* * * * *